(12) United States Patent
Lastere et al.

(10) Patent No.: US 8,700,235 B2
(45) Date of Patent: Apr. 15, 2014

(54) ESTIMATION OF A CRITERION OF LOAD TO WHICH A STRUCTURAL COMPONENT OF AN AIRCRAFT IS SUBJECTED, AND ASSISTANCE FOR THE DETECTION OF A SO-CALLED "HARD" LANDING BY VIRTUE OF SUCH A CRITERION

(75) Inventors: Nicolas Lastere, Auzeville Tolosane (FR); Melissa Duchesne, Tournefeuille (FR); Emmanuel Ray, Tournefeuille (FR)

(73) Assignee: Airbus Operations S.A.S., Toulouse (FR)

( * ) Notice: Subject to any disclaimer, the term of this patent is extended or adjusted under 35 U.S.C. 154(b) by 735 days.

(21) Appl. No.: 12/990,553

(22) PCT Filed: May 20, 2009

(86) PCT No.: PCT/FR2009/000598
§ 371 (c)(1),
(2), (4) Date: Nov. 1, 2010

(87) PCT Pub. No.: WO2009/153436
PCT Pub. Date: Dec. 23, 2009

(65) Prior Publication Data
US 2011/0046825 A1 Feb. 24, 2011

(30) Foreign Application Priority Data
May 22, 2008 (FR) .................................. 08 53350

(51) Int. Cl.
*G01M 17/00* (2006.01)
*G06F 17/40* (2006.01)

(52) U.S. Cl.
USPC ................... 701/16; 701/3; 73/802; 73/178 T

(58) Field of Classification Search
USPC .............. 701/3, 16, 32.2; 244/100 R; 73/802, 73/178 T
See application file for complete search history.

(56) References Cited

U.S. PATENT DOCUMENTS

| 5,511,430 A | 4/1996 | Delest et al. | |
|---|---|---|---|
| 2006/0112023 A1* | 5/2006 | Horhann et al. | ............. 705/407 |

(Continued)

FOREIGN PATENT DOCUMENTS

EP 0 657 723 6/1995

OTHER PUBLICATIONS

Roemer, M.J., et al., "Autonomous Impact Damage Detection and Isolation Prediction for Aerospace Structures," IEEE, IEEEAC paper #1341, Ver. 1, pp. 1-9, (2005).

(Continued)

*Primary Examiner* — Khoi Tran
*Assistant Examiner* — Spencer Patton
(74) *Attorney, Agent, or Firm* — Oblon, Spivak, McClelland, Maier & Neustadt, L.L.P.

(57) ABSTRACT

A method for estimating a loading criterion relating to the load experienced by a structural component of an aircraft, and assistance with detecting a so-called "hard" landing. The method includes measuring parameters of the aircraft and calculating at least one loading criterion for the loading of the structural component using at least one neural network receiving the parameters as input. Assistance with detecting a hard landing then includes determining of a time of impact of the aircraft on a landing strip from the measured parameters, then estimating a plurality of the parameters at the determined time of impact so as to calculate the at least one loading criterion relating to the loading of the structural component.

7 Claims, 4 Drawing Sheets

(56) References Cited

U.S. PATENT DOCUMENTS

2007/0008187 A1* 1/2007 Schmidt .................. 340/970
2007/0010921 A1* 1/2007 Ishihara et al. ............ 701/16
2008/0114506 A1* 5/2008 Davis et al. ............... 701/16
2009/0126471 A1* 5/2009 Fay et al. .................. 73/104

OTHER PUBLICATIONS

International Search Report issued Nov. 11, 2009 in PCT/FR09/000598 filed May 20, 2009.

* cited by examiner $$s = \Sigma\, c_k \cdot z_k$$
$$z_k = f(b_{0,k} + \Sigma b_{j,k} \cdot y_j)$$
$$y_j = f(a_{0,j} + \Sigma a_{i,j} \cdot x_i)$$

ESTIMATION OF A CRITERION OF LOAD TO WHICH A STRUCTURAL COMPONENT OF AN AIRCRAFT IS SUBJECTED, AND ASSISTANCE FOR THE DETECTION OF A SO-CALLED "HARD" LANDING BY VIRTUE OF SUCH A CRITERION

This invention relates to a method and a system for estimation of a criterion for the load sustained by a structural component of an aircraft, in particular an airplane for civil transport, to a method and a corresponding system for assistance in detection of a hard landing of the said aircraft, as well as to an aircraft comprising such systems.

In the context of this invention there is understood by load any stress to which the structure of the aircraft, and in particular the analyzed components, is/are subjected. "Loads," in their generic sense, cover any force, moment, load factor (or acceleration), structural stresses.

For an obvious purpose of safety, an inspection of the structure of the aircraft, as well as the repair of possible damage, must be performed as soon as the aircraft is subjected to significant loads, which is the case in particular during a hard landing. A hard landing is characterized by a significant vertical load factor (or acceleration) and vertical speed of the aircraft during landing.

The inspection referred to above generally is initiated by the pilot, according to what he experienced at the time of landing, when he deems that this landing was able to cause real damage to the structure of the aircraft. The reactions perceived in the cockpit, however, sometimes poorly express the actual load applied onto the aircraft as a whole, and in particular on each component that one wishes to monitor.

Systems automating the measurement of sizing loads of an aircraft then were proposed. The solution of document EP-A1-0 657 723 thus describes a system comparing a load measured at one location with a safe-load value determined from a predetermined development law and from a set of measured parameters. The result of the comparison then makes it possible to indicate whether an inspection should be performed, and possibly the parts of the aircraft that should be inspected.

Nonetheless, this solution has numerous drawbacks.

On the one hand, it requires the incorporation, into the aircraft and in addition to the sensors ordinarily used, of specific sensors for measuring the loads sustained at the various locations of interest. Such sensors may be many in number according to the number of components to be monitored. Moreover, they represent a sizeable financial cost for equipping an entire fleet of airplanes, a cost for maintenance of the sensors (to remedy possible degradations), as well as a cost in additional weight, for each of the airplanes, proportional to the number of locations to be analyzed.

On the other hand, the sometimes millimetric implementation of the aircraft makes the integration of such sensors very complex without calling for studies that are costly and detailed, if not impossible in inaccessible areas. The result is that the physical inspection of these unequipped parts by an operator still must be kept up after each landing. This situation then is detrimental in terms of maintenance costs and time for the aircraft.

Through the publication US 2008/114506, there also are known a method and a system for detecting events loading the structure of an aircraft with the aid of a neural-network type heuristic algorithm.

Peaks of loads or stresses on the structure are estimated from initial values and from peak values of measured parameters, then are compared with threshold values in order to detect a hard landing or not.

However, the peak values for each parameter measured generally occur at different instants. The result is that a combination of these values, through the neural network, cannot precisely retranscribe the maximal stresses sustained by the structure of the airplane at a precise unmeasured location.

In fact, either the peak values are taken independently and each reflects a precise (but not numerous) place in the aircraft, or they combine measurements corresponding to different instants and, therefore, cannot precisely retranscribe the stresses sustained in a precise place.

Moreover, these peak values do not actually retranscribe the stresses sustained by a structure.

This invention intends to remedy the drawbacks of the prior art by proposing a method and an associated system making it possible to estimate more simply and precisely the loads sustained at numerous locations of the structure of the aircraft.

To this end, the invention applies in particular to a method for assistance in the detection of a hard landing of an aircraft, characterized in that it comprises:

determination of an instant of impact of the said aircraft on a landing runway from measured parameters;

estimation of a plurality of the said parameters at the said determined instant of impact;

estimation of at least one load criterion for a structural component of the said aircraft, the said estimation comprising a step of calculating at least one load criterion for the said structural component with the aid of at least one neural network receiving the said estimated parameters as input.

In this way, during landing, load criteria at various locations of the aircraft structure are calculated from measurements made at the moment of the impact of this aircraft with the runway, that is to say when the landing stresses on the structure are the greatest. Precise estimations of the stresses are obtained at this instant.

In practice, one proceeds in that way for several structural components, that is to say by using several neural networks configured accordingly, each receiving all or part of the estimated parameters. These components may be, for example, the wing group, the landing gear, the fuselage, the engine nacelle pylons.

By virtue of this invention, information items concerning the loads sustained by a set of structural components of the aircraft, even unequipped with sensors, are available. It then becomes easy, for example by simple comparison, to evaluate whether these components require an inspection. These calculated load criteria also allow a pilot to back up or invalidate his experiential analysis, in order to provide a flight report.

It furthermore is noted that the neural networks make it possible to represent very complex models simply. These models thus are created and used at lower costs, in particular for processing, which makes it possible to implement the method according to the invention on board the aircraft. These networks thus are used to represent the models, generally not known, linking the measured values and different structural locations of the aircraft.

It is understood here that the neural network corresponds to any mathematical representation of structure for the interpretation of weights and thresholds that have been determined beforehand, in particular by apprenticeship of the network from at least one apprenticeship set associating values of the measured parameters with load criterion values.

The modeling power of the neural networks also makes it possible to be satisfied with the standard sensors with which airplanes are equipped, without installing new ones, in order to determine the stresses at any point of the structure of the aircraft. Such sensors are, for example, those provided for the recording of measurements of a digital flight data recorder or DFDR ("Digital Flight Data Recorder"). It usually concerns, in non-exhaustive manner, accelerations and speeds of the rigid body of the airplane, different angles of representation of the airplane in space and speeds associated with these angles, measurements referred to as static such as the position of the center of gravity of the airplane, the fuel on board and the gross weight of the aircraft.

In this way there is no need to provide a load measurement sensor for each component to be monitored.

Moreover, without the addition of new sensors, it is easy to incorporate this invention into airplanes already in service.

In one embodiment, a preliminary step of creating the said neural network is provided, this preliminary step comprising a first step of executing a plurality of simulations by varying at least one, generally a set, of the said measured parameters, the simulation determining a simulated value of a load sustained by the said component, and a second step of apprenticing the said neural network with the aid of the said simulations, the said neural network receiving as inputs the said at least one parameter. By virtue of the simulation, generally computer-assisted, it is possible to obtain coherent measurements for inaccessible components in an airplane and in particular at any point of the airplane.

In another embodiment of the invention, the said at least one calculated load criterion is compared with at least one first threshold value so as to determine an inspection operation of a first type to be carried out on the said structural component, following the said landing. This first threshold value may represent a first structural capacity of the component, for example a limit between use of the component in the context of an elastic deformation and use of the component in the context of a plastic deformation.

In this way it is possible to provide several threshold values defining however many types of inspection operations to be provided. In particular, if the said at least one calculated load criterion is greater than the said first threshold value, the said calculated load criterion is compared with a second threshold value so as to determine an inspection operation of a second type to be carried out on the said structural component. This second threshold value may represent another structural capacity of the component from which damage affecting the safety of the aircraft may be produced. Safety measures such as the holding of the aircraft on the ground until same is analyzed by the aircraft manufacturer then may be provided.

Thus, by virtue of these provisions, an indication of the structural components to be inspected according to the extent of the inspection to be performed may be obtained rapidly and automatically. The maintenance and upkeep of the airplane thereby are facilitated.

It also may be provided that a plurality of load criteria for a respective plurality of structural components is calculated and that the method comprises a step of indicating to the said pilot, for example by display of an information item according to which the landing was hard, when the comparison of at least one load criterion is such that an inspection operation should be performed. That enables the pilot to confirm his experiential analysis or not.

In one embodiment of the invention, the said determination of an instant of impact comprises the calculation of the instant corresponding to the first impact of the aircraft on the runway, the said calculation of the instant being performed with the aid of measured parameters representative of the speed of at least one wheel of the said aircraft. Unlike the known solutions based on determination of impact with the aid of measurements of compression of shock struts of the landing gears, this embodiment makes it possible to obtain a more precise determination of the instant of impact compatible with the calculation of a load criterion.

This calculation particularly may comprise the comparison of the speed of the at least one wheel of the said aircraft with a threshold value. For example, it comprises a linear regression from two measurements of speed of the said at least one wheel.

In particular, the said determination further comprises the calculation of at least one other instant of impact, subsequent to the said instant of first impact, the said calculation of the other instant being performed from a measured parameter of vertical acceleration of the said aircraft. While the determination of a later impact with the aid of the speed of the wheels no longer is possible starting from the first impact produced, this characteristic makes it possible to ensure, by another means, a determination of the later instant of impact also more precise than in the known solutions and compatible with the precision required for calculation of a load criterion.

According to a specific characteristic, an increment of vertical acceleration in the vicinities of at least two instants representative of at least two impacts is calculated and the instant having the greatest increment is selected. In this way later calculations are simplified by concentrating on the impact having the greatest vertical movement of the aircraft, that is to say the one likely to cause the most damage.

By comparison with the state of the art using peak values, the increments are representative of the stresses to which a structure is subjected because they are directly linked to the energy sustained by same during the instant of calculation of the increment.

The sensors used in airplanes usually perform discrete measurements at defined sampling speeds. It thus is provided that the said plurality of parameters is estimated by linear interpolation of the said measured parameters at the said instant of impact. In this way, the precision of the final calculation of the load criterion is increased.

According to one characteristic of the invention, it is contemplated that the said parameters are measured and recorded starting from the instant at which the said aircraft passes under a predefined altitude in relation to the said landing runway during an approach phase. In combination, it is provided to stop these measurements and recordings starting from the instant at which the speed of the aircraft, rolling on the said runway, passes under a threshold ground speed. As a variant, the measurements and recordings stop after a predetermined time, for example 30 seconds.

In this way, having measurements for the first impact of the aircraft on the runway as well as for possible subsequent rebounds of the aircraft is ensured.

Furthermore, it may be provided that measurements stop when the aircraft reaches a first predetermined speed or after a given time and, in this case, the said steps of determining and estimating are initiated when the aircraft reaches a second predetermined speed lower than or equal to the said first speed. The threshold value constituted by the first predetermined speed occurs in most cases. The use of the "given time" threshold makes it possible to limit the memory space used during more unusual situations, for example when an airplane makes an aborted landing and takes off again. All the same, the data may be processed to determine the impact of the aborted landing on the structure.

According to a specific characteristic of the invention, the said plurality of parameters is estimated by interpolation of the said measured parameters at the said instant of impact.

According to one aspect of the invention, the method comprises, prior to the said step of determining an instant of impact, a step of verifying measured parameters, in particular their presence, the associated sampling frequency and/or their inclusion in a predefined value range. In this way the invention is protected against possible failures of the systems/sensors and does not require totally reliable sensors.

According to another aspect of the invention, it is provided to create and calculate at least one unmeasured parameter. It is particularly a strength of the neural networks to enable, from diverse and various measures, the determination of other, sometimes unmeasurable, parameters. By virtue thereof, better decisions and calculations may be made.

Correlatively, the invention also relates to a system for assistance in the detection of a hard landing of an aircraft, characterized in that it comprises:

means for measurements of parameters of the said aircraft;

a means for determining, from the said measured parameters, an instant of impact of the said aircraft on a landing runway;

a means for estimating a plurality of the said parameters at the said determined instant of impact;

a system for estimating at least one load criterion for a structural component of the said aircraft, comprising at least one neural network arranged for receiving the said estimated parameters as input for supplying at least one load criterion for the said structural component as output.

The system optionally may comprise means relating to the characteristics of the above method for assistance in the detection of a hard landing.

The invention also applies to an aircraft comprising a system for estimating a load criterion or for assistance in detecting a hard landing such as set forth above.

The aircraft optionally may comprise means relating to the characteristics of systems set forth above.

Other features and advantages of the invention also will become apparent in the description below, illustrated by the attached drawing, in which:

FIG. 1 shows a general view of a course of an aircraft during its landing on the runway;

FIG. 2 schematically shows an exemplary system architecture according to this invention, on board the aircraft of FIG. 1;

Figure 1:
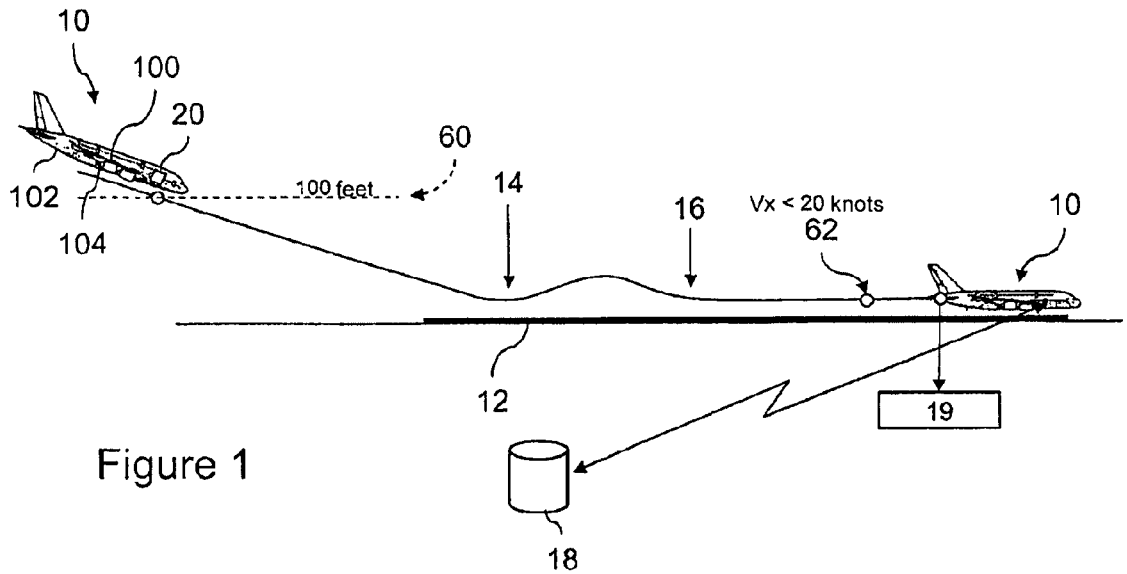

An airplane 10 during its landing on an airport runway 12 has been shown on FIG. 1. On this example, the path of airplane 10 shows that it is undergoing a rebound and therefore has two impacts 14 and 16 with the ground of the runway before coming to a standstill at the end of the runway. Airplane 10 is in communication with a station 18, here provided at the airport, for exchanging data.

Figure 2:
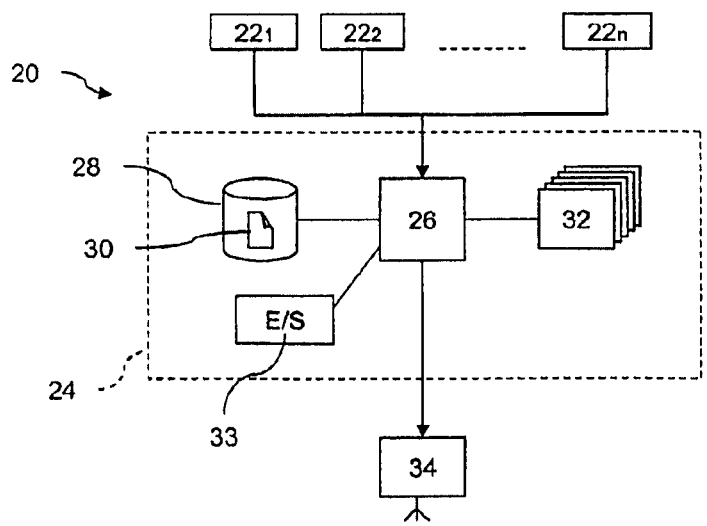

Airplane 10 has on board a system 20 for implementation of the invention, an example of this system being more detailed on FIG. 2. The purpose of this system 20 is to supply a report giving information on the harshness of the landing, possibly detailed by specifying different structural components potentially affected by the landing.

With reference to FIG. 2, this system 20 for determining the harshness of the landing comprises:

a plurality of sensors $22_i$ distributed at various locations in airplane 10;

a data-processing system 24 comprising a processing unit 26, a memory 28 storing a file 30 of parameters measured in airplane 10 and several definitions of neural networks 32, as well as an interface 33 with screen-and-keyboard type input and output means provided in the cockpit of airplane 10; and a communication means 34, of radio type or ACARS system ("Aircraft Communications Addressing and Reporting System" according to English terminology), allowing data communication with station 18.

Sensors $22_i$ are sensors ordinarily used in airplanes for various measurements of parameters referred to as "airplane parameters." These correspond to the parameters recorded in standard manner for the digital flight data recorder DFDR with which airplanes are equipped. Here there is provided the measurement of parameters of acceleration and speed of the rigid body of the airplane (for example ground speed Vx(t)), the measurement of different angles allowing the representation of the airplane in space (for example the roll angle $\phi(t)$), the measurement of the speeds associated with these same angles, the measurement of parameters considered as "static" with regard to the landing such as the position of the center of gravity of the airplane 10, the fuel on board and the gross weight of the airplane.

Other parameters usually are measured and their associated sensors also may be provided without affecting the invention, for example the position of the flaps, of the control surface, Sensors having a defined sampling frequency ($\Delta t$ being the sampling period) are used to measure the parameters varying dynamically. Parameters relatively stable all throughout the landing are measured only once during the start of recording as explained later; this is particularly the case for estimation of the fuel on board, the weight of the airplane as well as that of the center of gravity.

Data-processing system 24 belongs to an overall system for monitoring the conditions of the airplane, otherwise known as ACMS ("*Aircraft Condition Monitoring System*" according to English terminology). File 30 is a digital file storing the parameters measured by sensors $22_i$ as they are acquired, these parameters possibly being marked with hour and date for an easier later use. At the end of landing, this file 30 may be transmitted via radio means 34 to ground station 18 in order to perform an analysis similar to or more extensive than the one carried out on board the airplane and described below in an example.

Each neural network definition 32 corresponds to a mathematical modeling for calculation of a load sustained by a structural component of the aircraft, of a wing-group 100, a fuselage portion 102 or an engine-pylon 104 type. There are as many definitions 32 available as there are identified structural components to be monitored during landing.

These definitions 32 comprise coefficients (weights and thresholds) making it possible to create, in software form in processing unit 26, neural networks, here of the linear neural network type fully connected to several intermediate layers, here two, and to feed-back ("two-hidden layer linear feed-forward fully-connected neural network").

The neural networks correspond to mathematical structures generally implemented by a software program, using the weights and thresholds determined during a prior apprenticeship of the structure.

Figure 3:
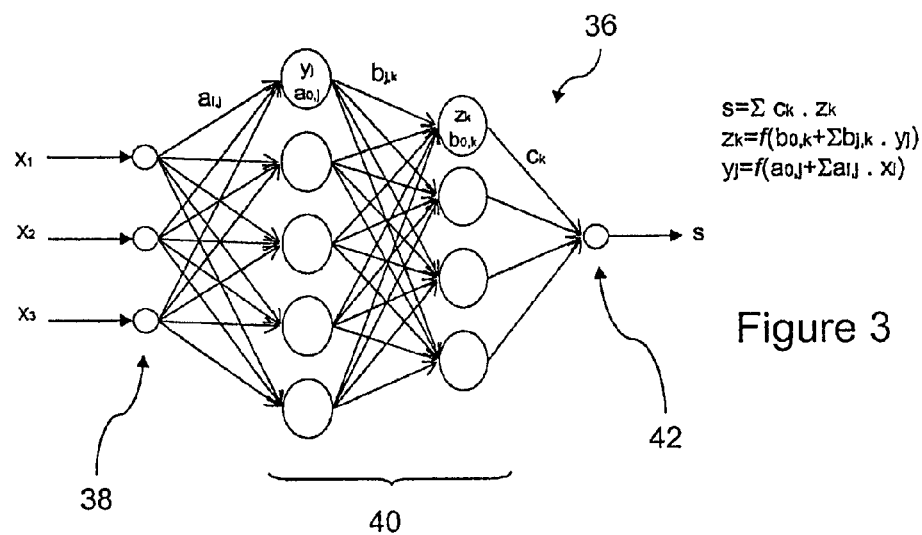
FIG. 3 illustrates the general structure of a neural network.

A partial illustration of such a network 36 is set forth in FIG. 3, having an input layer 38 receiving inputs $x_i$, two intermediate layers 40 defined by weights $a_{i,j}$ and $b_{j,k}$ and by thresholds $a_{0,j}$ and $b_{0,k}$, an output layer 42 defined by its coefficients $c_k$ and supplying an output value s (the threshold values here are unitary for each of the neurons of input layer 38 and output layer 42). Such a network 36 is equipped with a activation function $f(x)$, for example $1/(1+x)$ at each neuron.

Intermediate layers 40 in particular are each provided with 20 to 30 neurons, for example 25 neurons.

Figure 4:
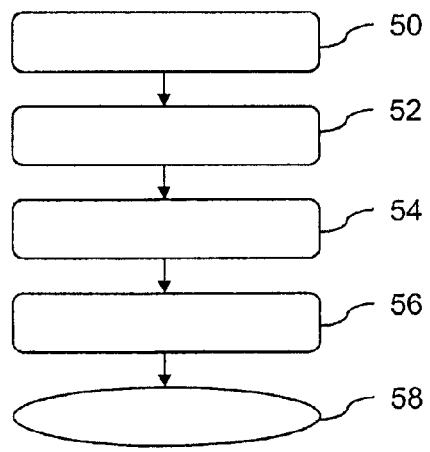
FIG. 4 shows, in the form of a logic diagram, steps in an exemplary processing according to the invention.

As illustrated by FIG. 4, this example generally comprises a first phase of acquiring the parameters of airplane 50, picking up in particular the measurements of sensors $22_i$, a second phase of processing these acquired parameters 52, then calculating 54 a load criterion for a structural component (100, 102, 104) of airplane 10, in particular with the aid of neural network 36 associated with this structural component (while other parameters may be processed directly as will be seen subsequently), and finally determining 56 the harshness of the landing at least with regard to the calculated load criterion.

At processing output, there is obtained an indication 58, for example unique, that is displayed in the cockpit of airplane 10 to assist the pilot in confirming his experience of the landing for purposes of drawing up a report on the harshness of the landing.

This indication 58 also may take the form of a data-processing report automatically transmitted, for example, to the maintenance teams.

As a variant, this indication 58 may specify the harshness situation with regard to each of the components analyzed, as touched on subsequently.

In greater detail, first acquisition phase 50 comprises the recording of measurements performed in file 30. This acquisition is initiated when airplane 10 is on approach and passes under a predetermined ceiling 60, as illustrated by FIG. 1, here the altitude of 100 feet above the runway (or approximately 300 m). Acquisitions and recordings of measurements are continued until airplane 10 finally has landed. To accomplish this, these operations are stopped after a period of 30 seconds deemed sufficient. As a variant, it may be provided to stop these operations as soon as the ground speed of airplane 10 passes under a predetermined value 62, here 20 knots (approximately 37 km·h$^{-1}$), making it possible to have between 30 and 60 seconds of recording of parameters for later processing 19. For the remainder of the description, the unit "knot," widespread in the aerodynamic field, is used. The individual skilled in the art easily will be able to convert these measurements into km·h$^{-1}$ with the equivalent 1 knot=1.85 km·h$^{-1}$.

As for processing 52 of the data so acquired, it is initiated when the ground speed of aircraft 10 also passes under a predetermined value, for example the same value as the one putting an end to the acquisitions. As a variant, a lower value making it possible to begin processing later, for example when the airplane stops in parking, may be adopted.

Processing 52 is intended to obtain the pertinent parameters for evaluation of the load criteria for the monitored components at the moment of greatest impact.

Figure 5:
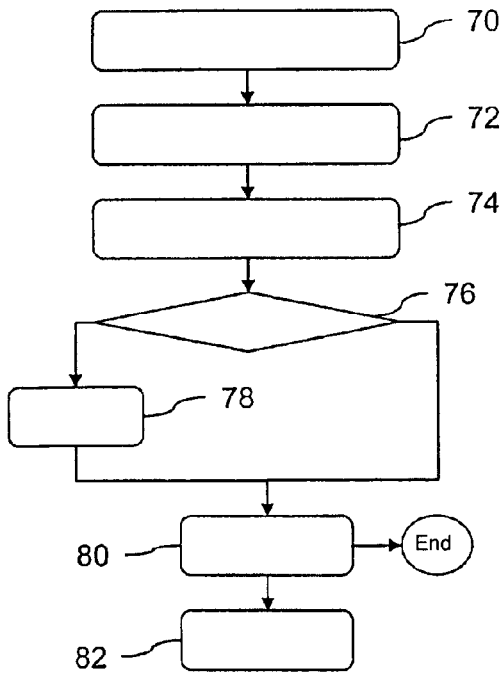
FIG. 5 shows, in the form of a logic diagram, steps in the processing of measured parameters during the process of FIG. 4.

As illustrated by FIG. 5, this processing 52 comprises a first preprocessing step 70 during which it is verified that all the measured parameters expected for pursuit of the analysis are present. Then it is verified that the sampling frequency corresponds to the one expected. Finally, it is ascertained that the acquired values satisfy value ranges provided for these parameters. Failing that, an error message may be sent back to the system and to the pilot.

In step 72, the instant $t_0$ of first impact 14 of airplane 10 on runway 12 is determined. In fact, several successive impacts may take place, for example when airplane 10 rebounds on runway 12.

In general, the speed of the wheels of the landing gears is used to determine this instant.

Figure 6:
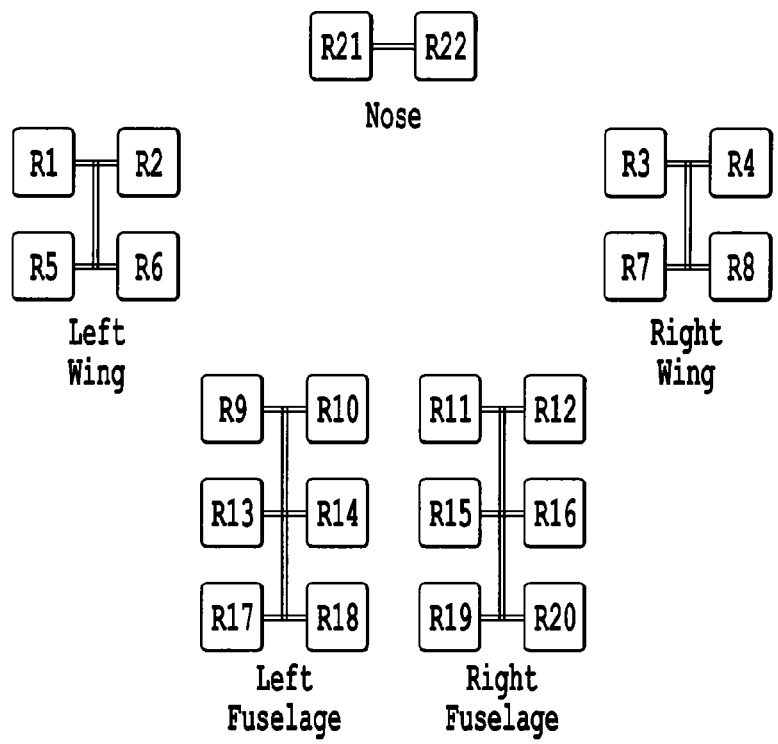
FIG. 6 illustrates an exemplary arrangement of landing gears illustrating a step of the process of FIG. 5.

This step is illustrated with the aid of FIG. 6 representing the landing gears of an A380 airplane. 22 wheels are distributed over five gears. Only wheels R1 to R16 of the Figure are equipped with tachometers to measure their respective speeds.

The linear speeds $\omega_i$ of wheels R1 to R16 recorded in file 30 therefore are retrieved. The instant $t_i$ at which the measured speeds exceed a threshold value A1, here 15 knots, is determined.

By marking as $\Delta t$ the sampling period of the measurements on the wheels, here 1/16 s, the instant t such that $\omega_i(t_i)<A1$ and $\omega_i(t_i+\Delta t)>A1$, which represents more or less the instant of touchdown of wheel i on runway 12 is calculated for each of wheels R1 to R16.

Figure 7:
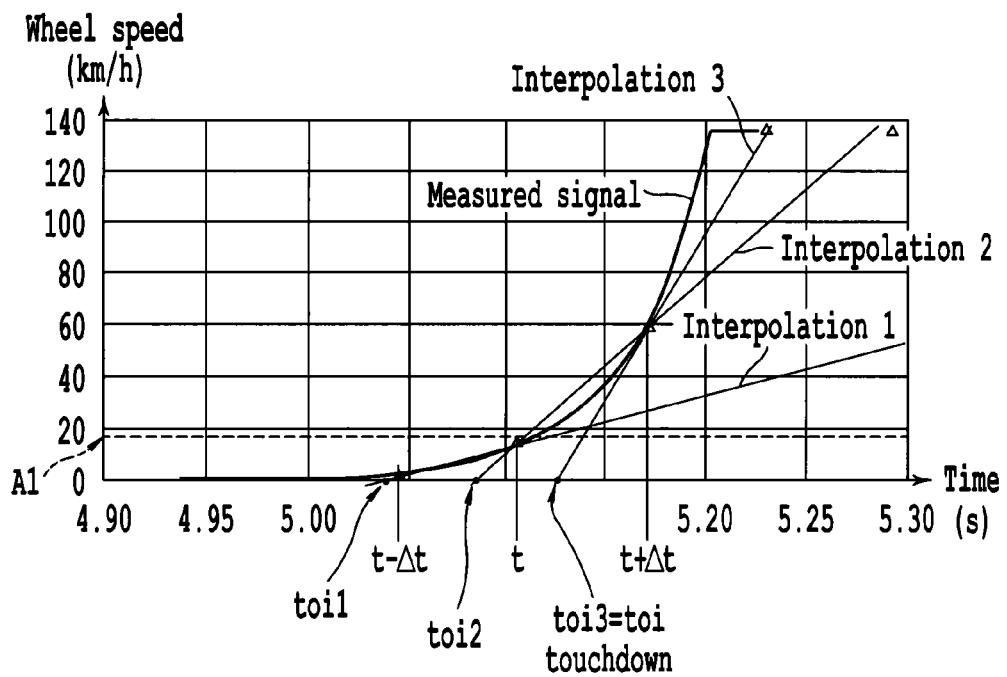
FIG. 7 illustrates the calculation of an instant of first touchdown of the airplane of FIG. 1 on the runway.

From this value $t_i$ three values $t_{0i1}, t_{0i2}, t_{0i3}$ are calculated by interpolation, such as illustrated on FIG. 7.

There then is chosen as instant $t_{0i}$ of touchdown of wheel i on the runway, the maximal value obtained: $t_{0i}=\max\{t_{0i1}, t_{0i2}, t_{0i3}\}$.

The earliest touchdown $t_{0i}$ for all the wheels corresponds to instant $t_0$ of first impact of airplane 10 on runway 12: $t_0=\min\{t_{0i}\}_{i\in[1;16]}$.

The value $t_0$ of the instant of impact thus has been interpolated from the recorded measurements.∈

In step 74, the parameters corresponding to the determined moment of impact 14 are calculated. Of interest here are the dynamic parameters that require an acquisition in time, unlike the invariable parameters such as the weight of the aircraft, the fuel on board or the center of gravity acquired once and for all at the start of recording 60.

The dynamic parameters at instant $t_0$ are interpolated from the recorded measurements, here by linear interpolation between the two samples stored in the vicinity of $t_0$. In this way there are obtained interpolated accelerations and speeds of the rigid body of the airplane (for example lateral and vertical accelerations at $t_0$: $ny_0$ and $nz_0$), interpolated angles for representation of the airplane in space, corresponding interpolated angular velocities, all at the instant $t_0$ of touchdown.

Then the greatest vertical acceleration $nz_{0max}$ sustained more or less at the moment of and subsequent to impact is determined as follows:

$nz_{0max}=\max\{nz(t)\}$ when $t\in[t_0; t_0+1$ second$]$.

The vertical load factor increment sustained then is deduced:

$\Delta nz_0=(nz_{0max}-nz_0)$

It is noted here that the increment generally is representative of the load level sustained by a component, unlike a peak value which, alone, does not give the intensity of the load.

Similarly, there is determined the lateral load factor increment sustained: $\Delta ny_0=\max(|ny(t)-ny_0|)$ when $t\in[t_0; t_0+1$ second$]$.

All the parameters corresponding to the instant $t_0$ of impact may be stored in the form of a vector of a dimension. A vector K1 may be applied in order to multiply this parameter vector so as to apply a corrective coefficient, if need be. This is particularly the case when tests for working out neural networks 36 are conducted under conditions slightly different than during operation of the airplane, for example with different sampling frequencies. By default, this vector is composed solely of 1.

During this step 74 there also is calculated a derotation coefficient $\theta_{d\text{-}derot}$ corresponding to the maximal value of lowering of the nose of airplane 10 in the second phase of landing (the angular pitch rate $\theta_d(t)$ being negative during lowering of the nose), that is to say after initial touchdown 14 at $t_0$. This calculation is performed with the aid of the angular pitch rate $\theta_d(t)$ as follows:

$t_2$ is determined such that the pitch angle $\theta(t_2)$<A2, for example A2=1°. That corresponds to a practically horizontal airplane 10; then $\theta_{d\text{-}derot}=\min\{\theta_d(t)\}$ for $t\in[t_2; t_2+1$ second].

Figure 8:
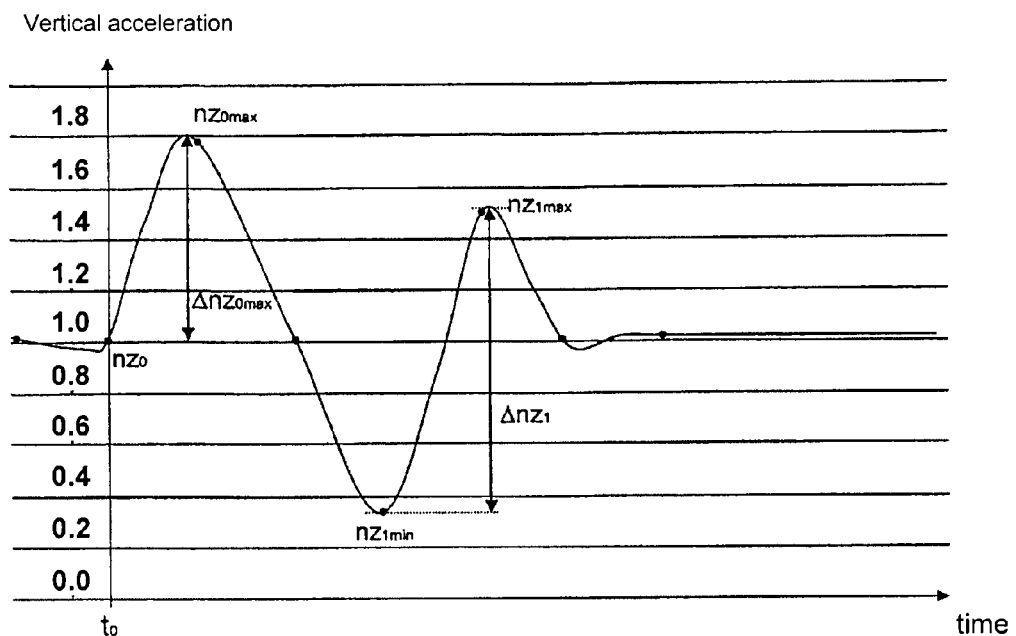
FIG. 8 illustrates the calculation of an instant of subsequent touchdown of the airplane on the runway corresponding to a rebound of same.

In step 76, it is determined whether a rebound 16 of airplane 10 has taken place and, if need be, whether it is taken into account, as illustrated on FIG. 8.

To accomplish this, a 1-second sliding window applied to the recorded measurements is used.

It is determined whether such a window exists in which:

$\max(nz(t))-\min(nz(t))$>A3, for example A3=0.7 g; in which case a rebound has been identified. The values nz of FIG. 8 take the weight into account. Balance therefore is obtained for an acceleration equal to 1 g.

The rebound is taken into account only if this increment $\max(nz)(t))-\min(nz)(t))$>$\Delta nz_0$. In fact, here it is sought to determine the instant at which the vertical acceleration sustained by airplane 10 is greater than during the first rebound. Then the rebounds having an increment lower than that of the first impact $t_0$ on runway 12 are discarded.

If several rebounds have been identified, only the one having the greatest vertical acceleration increment $\Delta nz$ is retained.

In the case in which a rebound 16 is identified and retained ("yes" output of step 76 on FIG. 5), step 78 consisting in determining the values of the parameters at the instant of this rebound is executed.

In this step, there is calculated minimal vertical acceleration $nz_{1min}$ obtained in this identified time window corresponding to instant $t_1$ of impact of airplane 10 on runway 12 during identified rebound 16. There also is calculated maximal vertical acceleration $nz_{1max}$ in this window (the associated instant is marked $t_{1max}$) so as to define the increment at this rebound impact: $\Delta nz_1=(nz_{1max}-nz_{1min})$.

Still in step 78, the parameters at instant $t_1$ of the rebound impact are calculated in a manner similar to step 74.

Lateral load increment $\Delta ny_1=\max(|ny(t)-ny_1|)$ when $t\in[t_1; t_1+1$ second], where |x| is the absolute value of x.

If need be, a factor K2 similar to K1 is used for applying corrective coefficients to these calculated parameters.

Step 80 is undertaken.

If no rebound is identified or retained ("no" output of step 76), step 80 is directly taken up.

For the remainder of the description, it is considered that a rebound 16 has been identified and retained. Subsequent calculations then are based in part on the values indexed with "1," that is to say corresponding to impact $t_1$ of rebound 16.

It is easily understood that in the absence of pertinent rebound, the values indexed with "1" are to be replaced by those corresponding to first impact 14 of the airplane on the runway, that is to say indexed with "0."

Step 80 has as an object to distinguish the calculations to be performed according to first criteria representative of the harshness of the impact of the airplane on the runway. Two criteria are to be taken into consideration: on the one hand the gross weight $P_{airplane}$ of the airplane, and the increment of vertical acceleration $\Delta nz_1$ sustained by the airplane.

The landing is described as slightly harsh when:

$\Delta nz_1$<A4 and $P_{airplane}$<A5, where A4 is a predefined parameter and A5 is the maximal calculation weight at landing or MLW ("Max Landing Weight"), or $\Delta nz_1$<A6 and $P_{airplane}$>A5, for example A6=0.5 g.

In this case, it is considered that only the landing gears may have been damaged. Processing then is simpler than for a landing deemed harsher as described farther on.

Thus, with the aid of a predefined table (look-up table) and according to different angles interpolated at instant $t_1$, the landing gears to be inspected following the landing are determined here. In fact, depending on the pitch and roll values of the airplane at instant $t_1$, the landing gears sustaining impact are different. For example, with a certain roll angle, it is gears 1, 2, 4 and 6 that touch the runway first. For an opposite roll angle, it is landing gears 3, 4, 7 and 8. In cases of slightly harsh landing not covered by the cells of this table, no inspection of components of the airplane is provided; the landing is not described as "hard." This determined information may be sent back to the pilot.

Processing then ends.

More precisely of interest now are the cases in which the landing is considered as potentially harsh, that is to say when:

$\Delta nz_1$>A4 and $P_{airplane}$<A5; or $\Delta nz_1$>A6 and $P_{airplane}$>A5.

Step 82 then is undertaken with the calculation of an adhesion coefficient Sr subsequently used as input for certain neural networks in the evaluation of load criteria. This coefficient Sr characterizes a contribution of stresses due to the wheels.

This step 82 comprises first of all determining the time $t_{su}$ of spin-up of the wheels, calculated for example as the minimal value of the spin-up time of each wheel: $t_{su}=\min\{t_{su\_i}\}_{i\in[1;\ 16]}$. Each spin-up time $t_{su\_i}$ of a wheel $R_i$ is determined as the time between $T_{0i}$ previously calculated during step 72 above and an instant $t_{si}$ interpolated in the vicinity where the angular velocity $\omega_i$ exceeds a threshold value.

Step 82 then comprises determining the adhesion or friction coefficient Sr. For this purpose, there is used a first neural network which takes, as input, some of the airplane parameters previously introduced as well as the calculated values $\Delta nz_0$ and $t_{su}$.

The configuration of the neural network generally is performed, prior to its incorporation into the airplane, through the estimation of the weights and thresholds adapted for defining a mathematical model linking the above parameters to the Sr value desired as output.

These working-out processes comprise, for example, a set of simulations, for example several thousands of landing simulations, in which the above input parameters are made to vary and the simulated values corresponding to the output size of the neural network to be configured are obtained.

These sets made up of input parameters and simulated values are learned by the neural network according to standard techniques which, therefore, will not be explained in greater detail here.

Several apprenticeship tests may be performed by making use of the number of neurons per layer and/or the number of layers.

There then is determined, with other sets of values in order to validate the model, a standard deviation representative of the error generated by the model. That consists in retrieving the output value of the network "having learned" by entering as input the input parameters of the sets for validating, and in comparing the output value with the simulated values of these sets. The neural network configuration having the minimal standard deviation then is retained. Different neural network architectures therefore may be obtained, depending on the mathematical models and the simulations implemented.

Reverting to the use of the values measured in the airplane then interpolated, by applying the input values at the neural network (at the respective input positions provided during apprenticeship) provided for calculation of the adhesion coefficient, there is obtained an Sr value that is compared with two threshold values: 0.8 and A8=0.95.

If $0.8 \leq Sr \leq A8$, then Sr=0.8; making it possible to limit the value of the adhesion to those ordinarily used.

If Sr<0 or A8<Sr, then the adhesion coefficient is not valid. An error message is transmitted and the processing according to the invention is ended.

In the case in which a rebound 16 has been identified, it is determined whether the runway adhesion has generated a stress on the wheels, which is the case when the wheels are slightly in rotation or even immobile at rebound.

Thus, at instant $t_1$ there is determined the minimal speed of the wheels which is compared with a threshold value A9, for example 40 knots, from which it is estimated that the adhesion no longer is generating stress:

If min $\{\omega_i(t_1)\}_{i \in [1;\ 16]} > A9$, then Sr=0 because the wheels already are in rotation.

Otherwise Sr is unchanged.

This limitation in relation to A9 is optional and may be omitted in order to reduce the processing to be performed.

At the end of step 82, all the calculated or interpolated parameters (all originating from recorded airplane parameters) are available for undertaking the calculation, strictly speaking, of criteria for loads on different structural components of airplane 10. It is recalled here that we are in the case in which a potentially harsh landing has been detected.

Step 54 then is taken up.

Figure 9:
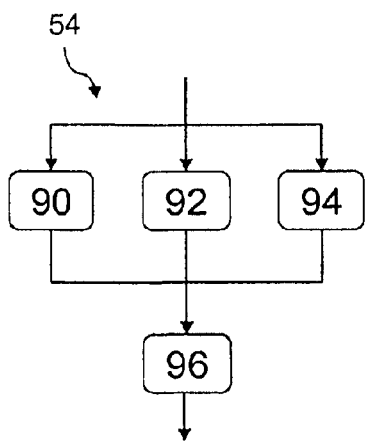
FIG. 9 illustrates the step of calculating a load criterion used during the process of FIG. 4.

With reference to FIG. 9, this step 54 comprises three sets for calculation of load criteria or harshness of impact, which calculations may be performed successively or at the same time: load on the landing gear of the nose (90), load on the other landing gears with the aid of the lateral acceleration (92), and loads on any type of structural component to be monitored, including the landing gears if desired (94).

During step 90, a first parameter $C_{mod}$, characterizing the speed of the airplane at the impact considered, is calculated with the aid of a neural network. This neural network receives as input the previously calculated or interpolated values. It is recalled that this value $C_{mod}$ was able to be obtained during simulations so that the neural network here generates such a parameter from the inputs used.

Then the following calculations are undertaken so as to generate a load criterion for the front gear according to the weight of the airplane $P_{airplane}$, $C_{mod}$, angle of derotation $\theta_{d\_derot}$.

As a variant, this second sub-step may be incorporated into the neural network used for the $C_{mod}$ calculation with no particular difficulty.

In this way a first load criterion for the nose landing gear is obtained with the aid of a neural network.

During step 92, it is determined, in a manner similar to step 80, with the aid of a table, whether a service operation on one or more landing gears is necessary. The information is sent directly back to the pilot, who records it in his report.

During step 94, the load criterion for each of the structural components to be monitored is determined. It doesn't matter which structural component inside the airplane may be concerned, since a corresponding neural network then is provided as indicated above.

Thus, a set of previously calculated parameters is injected as input $x_i$ of the neural network corresponding to a component to be monitored. Here only "airplane" parameters originating from standard sensors and estimated at the moment of the touchdown to which the above-described processing applies advantageously are used.

Since this network was configured as explained above, it supplies a value $C_i$ for the criterion of the load sustained by the said structural component.

By way of example, some exemplary components for which it is useful to determine the criteria for load sustained are listed below:

vertical load of the landing gears of the wings or of the fuselage;
load for recoil rod of landing gears of the fuselage;
twisting moment of the wings;
bending moment of the fuselage;
twisting moment of the fuselage; and
vertical load of the fuselage.

The load criteria obtained in this way as output from the different neural networks are not correlated with each other, unlike the input parameters that generally correspond to the instant of the impact considered.

Once these load criteria are obtained, step 96 determining the harshness of the landing on each of the monitored components is taken up.

Figure 10:
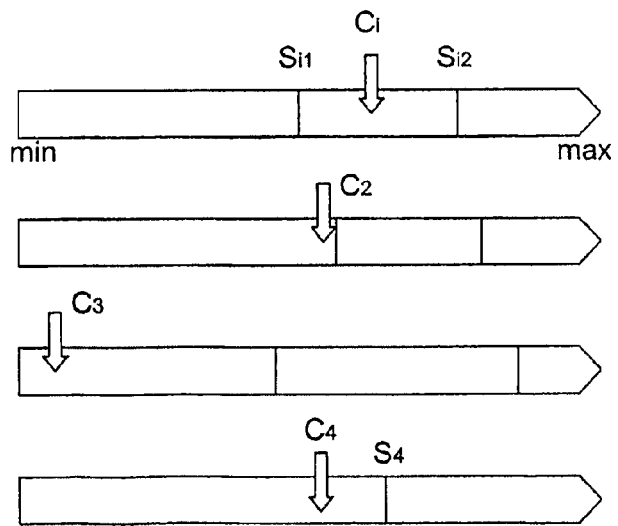
FIG. 10 illustrates the step of calculating a load criterion used during the process of FIG. 4.

As illustrated by FIG. 10, during this step load criterion $C_i$ obtained is compared with two predefined threshold values Si1 and Si2 (specific to the component considered) as characteristic of the structural capacities of the component. This comparison in particular may be implemented with the aid of a ratio between the calculated criterion and, for example, first threshold value Si1.

If the load criterion obtained is lower than the two threshold values, no message is transmitted concerning the associated component.

If the load criterion obtained is higher than the first of the two thresholds, a message of a first type, here that an inspection of the component should be performed, is transmitted. That corresponds to a component potentially having sustained a detectable deterioration.

In this case, it also is verified whether the load criterion is higher than the second threshold. If so, the component should be regarded as potentially seriously damaged. A message indicating that an inspection and detailed verifications should be performed is transmitted. Generally a repair as indicated in the structural repair manuals is provided. It also may be recommended to contact the manufacturer of the airplane.

The preceding processing based on neural networks does not require significant calculating powers. Thus, messages may be transmitted even when the airplane arrives at its parking site.

In this way the pilot receives all the messages that he takes into account in his flight report. These messages in particular enable him to confirm or invalidate his experience of the landing in order to describe it as "hard" or not.

These messages also may be saved or sent, via radio means 34, to station 18. In this way the latter has available, in detailed form, all the components to be inspected.

Thus, unlike many solutions of the prior art in which all the components had to be inspected in the event of a hard landing, here the inspection and maintenance are guided and greatly reduced.

This invention thus may be applied with a view to determining an indicator of landing harshness for standard landings as well as for those with rebound(s) or skidding due to a lateral acceleration.

The preceding examples are merely some embodiments of the invention, which is not limited thereto.

The invention claimed is:

1. A method for assistance in detection of a hard landing of an aircraft, said method comprising:
    determining an instant of impact of said aircraft on a landing runway from measured parameters;
    estimating a plurality of said parameters at said determined instant of impact;
    estimating at least one load criterion for a structural component of said aircraft, said estimating comprising:
    a step of calculating at least one load criterion for said structural component with at least one computer assisted neural network receiving said estimated parameters as input,
    wherein said at least one calculated load criterion is compared with at least one first threshold value so as to determine an inspection operation of a first type to be carried out on said structural component, following said landing,
    wherein said step of determining the instant of impact comprises calculating an instant corresponding to a first impact of the aircraft on the runway based on measured parameters representative of the speed of at least one wheel of said aircraft, and calculating at least one other instant of impact, subsequent to said instant of first impact from a measured parameter of vertical acceleration of said aircraft, and
    wherein an increment of vertical acceleration is calculated in the vicinities of at least two instants representative of at least two impacts and the instant having the greatest increment is said determined instant of impact.

2. The method according to claim 1, in which a plurality of load criteria of a respective plurality of structural components is calculated, and the method comprises a step of indicating to the pilot of the aircraft when the comparison of at least one load criterion is such that an inspection operation should be performed.

3. The method according to claim 1, in which said parameters are measured and recorded starting from the instant at which said aircraft passes under a predefined altitude in relation to said landing runway during an approach phase.

4. The method according to claim 3, in which measurements stop when the aircraft reaches a first predetermined speed or after a given time, and said steps of determining and estimating are initiated when the aircraft reaches a second predetermined speed lower than or equal to said first speed.

5. The method according to claim 1, in which said plurality of parameters is estimated by interpolation of said measured parameters at said instant of impact.

6. The method according to claim 1, comprising, prior to said step of determining an instant of impact, a step of verifying the measured parameters.

7. The method according to claim 1, in which at least one unmeasured parameter is created and calculated.

* * * * *